United States Patent
Essadouni et al.

(10) Patent No.: US 9,102,404 B2
(45) Date of Patent: Aug. 11, 2015

(54) METHOD FOR CONTROLLING THE DECELERATION ON THE GROUND OF A VEHICLE

(75) Inventors: Malika Essadouni, Muret (FR); Xavier Dal Santo, Nantes (FR)

(73) Assignee: AIRBUS OPERATIONS S.A.S., Toulouse (FR)

( * ) Notice: Subject to any disclaimer, the term of this patent is extended or adjusted under 35 U.S.C. 154(b) by 0 days.

(21) Appl. No.: 13/448,719

(22) Filed: Apr. 17, 2012

(65) Prior Publication Data

US 2012/0296498 A1 Nov. 22, 2012

(30) Foreign Application Priority Data

Apr. 19, 2011 (FR) ...................................... 11 01219

(51) Int. Cl.
*B64C 25/42* (2006.01)
*B60T 8/17* (2006.01)

(52) U.S. Cl.
CPC ............. *B64C 25/426* (2013.01); *B60T 8/1703* (2013.01)

(58) Field of Classification Search
CPC ... B60W 10/18; B60W 50/14; B60T 2201/02; G01C 23/00; G01C 23/005; G08G 5/0021; G08G 5/0013; G08G 5/0052
USPC .............. 701/3, 41, 70, 93, 95, 472, 470, 23; 303/165; 700/80; 318/373
See application file for complete search history.

(56) References Cited

U.S. PATENT DOCUMENTS

| | | | |
|---|---|---|---|
| 3,920,282 A | 11/1975 | DeVlieg | |
| 4,076,331 A | 2/1978 | DeVlieg | |
| 4,120,540 A | 10/1978 | DeVlieg | |
| 4,367,529 A | 1/1983 | Masclet et al. | |
| 2003/0220731 A1* | 11/2003 | Zierolf | 701/71 |
| 2006/0186267 A1 | 8/2006 | Steiner et al. | |
| 2006/0243857 A1 | 11/2006 | Rado | |
| 2006/0290202 A1* | 12/2006 | Shibata et al. | 303/165 |
| 2007/0100532 A1* | 5/2007 | Miyajima et al. | 701/95 |
| 2007/0208466 A1* | 9/2007 | Meunier | 701/16 |
| 2007/0222285 A1 | 9/2007 | Ribbens et al. | |
| 2007/0252036 A1 | 11/2007 | Steiner et al. | |
| 2008/0030073 A1 | 2/2008 | Goodman et al. | |
| 2008/0154445 A1 | 6/2008 | Goodman et al. | |
| 2009/0240413 A1* | 9/2009 | Miyajima et al. | 701/70 |

(Continued)

FOREIGN PATENT DOCUMENTS

FR 2 372 058 6/1978

OTHER PUBLICATIONS

French Preliminary Search Report issued Feb. 6, 2012, in French 1101219, filed Apr. 19, 2011 (with English Translation of Categories of Cited Documents).

*Primary Examiner* — Helal A Algahaim
*Assistant Examiner* — Jelani Smith
(74) *Attorney, Agent, or Firm* — Oblon, McClelland, Maier & Neustadt, L.L.P.

(57) ABSTRACT

The invention relates to a method for controlling the deceleration on the ground of a vehicle. The method obtains, from the crew of the vehicle or from an outside operator, parameters relating to its current position and its current speed. Then it determines a reference position and speed of the vehicle, the reference position being a theoretical position to be reached by the vehicle. Finally it determines, from indicated parameters and from reference parameters, a deceleration command with a view to ending up at a target position at a preselected speed.

19 Claims, 2 Drawing Sheets

(56) References Cited

U.S. PATENT DOCUMENTS

| | | |
|---|---|---|
| 2009/0276133 A1 | 11/2009 | May et al. |
| 2009/0292433 A1 | 11/2009 | Goodman et al. |
| 2009/0319126 A1* | 12/2009 | Miyajima et al. ............... 701/41 |
| 2010/0299005 A1* | 11/2010 | Hugues ........................... 701/16 |
| 2010/0299038 A1 | 11/2010 | Rado |
| 2010/0299039 A1 | 11/2010 | Rado |
| 2010/0299040 A1 | 11/2010 | Rado |
| 2010/0307844 A1* | 12/2010 | Peters ............................ 180/60 |
| 2011/0077833 A1 | 3/2011 | Rado |
| 2011/0257830 A1 | 10/2011 | Rado |

* cited by examiner

METHOD FOR CONTROLLING THE DECELERATION ON THE GROUND OF A VEHICLE

The invention relates to a method for controlling deceleration on the ground of a vehicle, more particularly of an aircraft such as an airplane.

Because of airport congestion and the costs generated by use of landing areas, efforts have been made to reduce the time during which these infrastructures are occupied by airplanes.

Most transport airplanes are equipped in known manner with an automatic braking system that produces a predefined deceleration according to the needs of the crew after touchdown of the wheels. This deceleration makes it possible in particular to have the airplane end up at a given point at a given speed.

For this purpose, certain airplanes are equipped with an automatic braking system known under its English terminology of "Brake to Vacate" (BTV). This system advantageously makes it possible to adapt a braking profile according to the characteristics of the ending point, known outside conditions and other parameters indicated by the crew.

The BTV system works out deceleration profiles according to a model referred to as "ramp-plateau," consisting, as its name suggests, of a progressive linear deceleration from a zero initial value up to a final set value with, for a possible option, a hard continuous braking in case of danger. Another deceleration model, referred to as "plateau-ramp," consisting of a degressive linear deceleration from a set initial value also is known.

The method used by the BTV system, however, does not always make it possible to find a solution to the system of equations to be solved in order to calculate the deceleration command. Certain dynamic conditions, such as the speed and position of the airplane, its weight or the position of the ending point, may have values such that the system of equations does not allow any solution.

The current calculation method in fact is based on an estimate of the time for switchover of the ramp to the fixed plateau. It so happens that, when the chosen value for the plateau is too high in relation to the actual braking need (determined by the dynamic conditions that may vary according to the quality of the runway, the wind velocity, etc.), the switchover time becomes greater than the braking time and the calculated profile no longer corresponds to any physical solution. This generally brings about an overly hard deceleration, leading to an overly long runway occupancy time.

This invention therefore proposes to resolve at least one of the problems set forth above by automatically adapting the braking parameters ("braking" is understood as the controlled application of a force counter to the direction of forward movement of the vehicle and producing a deceleration) to dynamic conditions and to disturbances.

More particularly, the invention has as an object a method for controlling the deceleration on the ground of a vehicle, characterized in that it comprises the following steps:
   obtaining a preselected deceleration value;
   obtaining current dynamic parameters representative of the current position and the current speed of the vehicle;
   determining, from the said obtained parameters and from the preselected deceleration value, a reference position and speed of the vehicle, the reference position being a theoretical position to be reached by the vehicle;
   determining, from the said parameters and from the said reference position and speed, a deceleration command with a view to obtaining a preselected ending position and speed of the vehicle.

The deceleration command thus depends on a deceleration profile established from the preselected ending position and speed.

The preselected deceleration value corresponds in particular, in the case of a plateau-ramp or ramp-plateau type profile, to the value of deceleration of the plateau.

Since the preselected deceleration value is necessary to the calculation of the reference position and speed values, this step of obtaining the preselected deceleration value takes place prior to obtaining current dynamic parameters.

In the context of a device implementing the method that is the object of the invention, the preselected deceleration value may be defined by the crew of the vehicle, by an outside operator or automatically (choice by default).

Advantageously, the deceleration command ("deceleration command" is understood as the deceleration value which the method that is the object of the invention communicates to means able to apply a braking) no longer depends on switchover time but on certain reference parameters.

The reference position corresponds to a theoretical position which the value of the current position of the vehicle should approach, and ideally should reach. The reference position corresponds more precisely to the position at which the vehicle would be situated moving, on the one hand, at the current speed and, on the other hand, according to a deceleration for which the vehicle would reach the ending position at the preselected ending speed. The reference position generally depends on the conditions of advance of the vehicle.

This deceleration depends on the type of deceleration profile chosen: if it is a matter of a ramp-plateau profile, it corresponds to the maximum deceleration; if it is a matter of a plateau-ramp profile, it corresponds to a deceleration close to zero (value E). If the current position is different from the reference position, the profile is recalculated as described farther on.

As for the reference speed, it corresponds to the speed that the vehicle would have at its current position if it was moving according to the deceleration making it possible to reach the ending point at the preselected ending speed.

These two theoretical values intrinsically depend on phenomena able to influence the deceleration of the vehicle, such as the weather conditions, the relief of the land, the ground surface, etc., and thus make it possible to adapt the braking.

In this way, the invention proposes an adaptation of the deceleration command of the braking parameters being implemented according to physical and mathematical criteria, ensuring an arrival at a target point (stopping position or point) at the desired speed, and this while guaranteeing that the system of equations to be solved in order to determine the deceleration command offers a solution irrespective of the braking conditions.

Furthermore, by virtue of this dynamic calculation mode for the deceleration command, additional safety braking commands become easier to integrate so as to create a complete system.

The invention therefore may be used to produce an auto-adaptive command with profiles applying to arrival target points and safety speeds.

In order to better adapt to environmental conditions certain examples of which have been cited above, the method comprises the running, in iterative manner, of a succession of at least some of the aforementioned steps.

For example, after running of a succession of the aforementioned steps of the device (or only of some of them), the method activates a new succession of steps during which, following the step of updating the deceleration command, the method activates a new iteration of steps starting off at the step of obtaining current dynamic parameters.

According to a possible characteristic, the value of the reference position of the vehicle is determined in real time from the current speed of the vehicle and the preselected deceleration value obtained.

The reference position of the vehicle therefore may be defined as the position at which the vehicle would be situated moving at the current speed and according to the deceleration $nx_{LVL}$ for which it would reach the ending point at the preselected ending speed.

In this way, in the case of a plateau-ramp profile, the theoretical position corresponds to the position in which the vehicle would be situated moving at its current speed, according to the preselected deceleration obtained beforehand.

This calculation choice allows the reference position to fulfill its function as position to be reached.

For this deceleration profile, the value of the reference position $X_R$ is calculated according to the formula $$X_R(V) = X(t_1) + \frac{2}{3} \frac{V(t_1) - V(t_0)}{g \cdot nx_{SEL}} \left[ \sqrt{\frac{V - V(t_0)}{V(t_1) - V(t_0)}} (V + 2 \cdot V(t_0)) - (V(t_1) + 2 \cdot V(t_0)) \right]$$

where V is the current speed (V and V(t) are merged here, V implicitly depending on the instant considered), $t_0$ is the moment of activation of the device, $t_1$ the moment of end of deceleration, g the universal gravitation constant, and $nx_{SEL}$ the preselected deceleration value.

In the case of a ramp-plateau profile, the profile beginning at the preselected deceleration, the reference position corresponds to the position in which the vehicle would be situated moving at its current speed, with near-zero deceleration.

For this deceleration profile, the value of the reference position is calculated according to the formula $$\begin{cases} X_R(V) = X(t_1) - \frac{(V(t_1) - V(t_0))^2}{g \cdot nx_{SEL}} \left[ \frac{(4 \cdot V(t_1) + 2 \cdot V(t_0))}{3 \cdot (V(t_1) - V(t_0))} - \frac{2 \cdot V(t_0)}{V(t_1) - V(t_0)} \beta - 2\beta^2 + \frac{2}{3}\beta^3 \right] \\ \beta = 1 - \sqrt{\frac{V - V(t_1)}{V(t_0) - V(t_1)}} \end{cases}$$

The method further may comprise an initial step of preselecting control parameters for deceleration.

In the context of a device using the method that is the object of the invention, these control parameters are indicated by the crew of the vehicle, by an outside operator or automatically (choice by default).

According to a possible characteristic, these control parameters for deceleration comprise the ending position of the vehicle, the speed of the vehicle on arrival at this ending position (preselected ending speed), a type of deceleration profile of the vehicle and the preselected deceleration value.

At least some of the values of the reference position of the vehicle, the reference speed of the vehicle, and the preselected deceleration value may be updated interdependently in the course of the same iteration of the succession of at least some of the aforementioned steps.

In particular, an updating of the preselected deceleration value may be performed in the course of an iteration when certain conditions or disturbances are encountered.

This makes it possible to optimize the robustness of the braking law with regard to possible disturbances that might add to or substitute for its deceleration command.

The value of the reference speed is determined in real time from the current position of the vehicle and from the preselected deceleration value.

The reference speed corresponds to the speed that the vehicle would have at its current position if it was moving according to deceleration $nx_{LVL}$ for which the vehicle would reach the ending point at the preselected ending speed. This parameter $nx_{LVL}$ makes it possible to retain the same formula whether the deceleration profile is of ramp-plateau or plateau-ramp type.

The value of the reference speed is calculated according to the formula $$V_R = -g \cdot nx_{LVL} \cdot T \cdot \left( \sqrt{1 - \frac{2(X_{STOP} - X)}{g \cdot nx_{LVL} \cdot T^2}} - 1 \right)$$

where the parameters $X_{STOP}$ and T are defined by the formulas $$X_{STOP} = X_{EXIT} - \frac{V_{EXIT}^2}{2 g n x_{LVL}} \text{ et } X_{STOP} = X + T \cdot V - \frac{V^2}{2 \cdot g \cdot nx_{LVL}}$$

$X_{EXIT}$ being the value of the ending position and $V_{EXIT}$ the desired (preselected) speed at this position (preselected ending speed).

In the particular case where the vehicle is an aircraft and where the law of deceleration is used to prevent an overshooting of the end of the runway, $X_{STOP}=L$ where L is the length of the runway.

In this way, in the case of a ramp-plateau profile, the value of $nx_{LVL}$ corresponds to the value of maximum deceleration. The reference speed of the vehicle therefore may be defined as the theoretical speed that the vehicle would have at its current position if it was moving according to the maximum deceleration obtained beforehand. In this case, the current speed is at any moment less than the reference speed. This calculation choice is coherent in relation to the definition of reference position.

In the case of a plateau-ramp profile, the value of $nx_{LVL}$ is set as being very low. In this case, the current speed at any moment is greater than the reference speed.

The method further may comprise a step of updating the preselected deceleration value in the course of the same iteration, the updating step taking place between the step of determining the reference position and the step of determining the reference speed.

This updating step is performed in particular in the case where outside disturbances as a whole have contributed toward the braking being more effective than anticipated. It comes down to reducing the preselected deceleration value so as to prevent the braking from terminating before the ending position or point, which would amount to occupying the runway for too long a time in the case of roll of an airplane on a landing runway.

The method further may comprise a step of determining the deviation between the current speed of the vehicle and the reference speed of the vehicle and/or a step of determining the deviation between the current position of the vehicle and the reference position of the vehicle.

The updating of the preselected deceleration value then is performed from the determination of the deviation between the current speed of the vehicle and the reference speed of the vehicle and/or from the deviation between the current position and the reference position.

In particular, the updating of the preselected deceleration value is performed by reducing it proportionally according to the deviation between the current position of the vehicle and the reference position of the vehicle.

In the event of detection of an overshoot of the ending position by the vehicle, the method further may comprise a step of changing the deceleration profile of the vehicle. The preselected deceleration value is updated until commanding maximum deceleration if necessary.

This detection takes place in particular if the value of the current position of the vehicle exceeds that of the ending position by more than a predefined safety threshold, or else if this value overshoots the end of the runway if the vehicle considered is an aircraft.

According to one characteristic, the deceleration profile is of "ramp-plateau" or "plateau-ramp" type, which are the profiles commonly used in the context of landing of an aircraft.

The invention also has as an object a device for controlling the deceleration on the ground of a vehicle, characterized in that it comprises:
  means for obtaining current dynamic parameters representative of the current position and the current speed of the vehicle;
  means for determining, from the said parameters obtained, a reference position and speed of the vehicle, the reference position being a theoretical position to be reached by the vehicle;
  means for determining from the said parameters and the said reference position and speed, a deceleration command with view to obtaining a preselected ending position and speed of the vehicle.

This device further comprises means for receiving parameters for control of deceleration.

In this way the parameters for control of deceleration may be indicated by the crew of the vehicle, by an outside operator or by default.

The device further may comprise means for displaying at least some of the results determined by the aforementioned determining means, namely the reference position and speed and the deceleration command.

In this manner, the crew or an outside operator is informed of these values at each iteration.

The device further may comprise means for obtaining an estimate of the position where the vehicle will reach the preselected ending speed.

In fact, this position may be different from the ending position following the occurrence of an unforeseen event changing the advance of the vehicle.

This estimate allows the crew or an outside operator to note effects of outside conditions on braking and to anticipate a possible delay in the advance of the vehicle or a danger.

The invention also relates to an aircraft comprising at least one device according to the invention.

Other characteristics and advantages will become apparent in the course of the description that is going to follow, given by way of non-limitative example and presented with reference to the attached drawings, on which FIG. 1 is a schematic representation of an airplane on a landing runway illustrating parameters representative of various positions of an airplane on landing;

The method that is the object of the invention makes it possible to determine, in real time, simply, precisely and so as to adapt automatically to unforeseen events, the value of a deceleration command to be applied to a vehicle in order that the latter may reach a given position with a given speed (ending position and speed).

Figure 1:
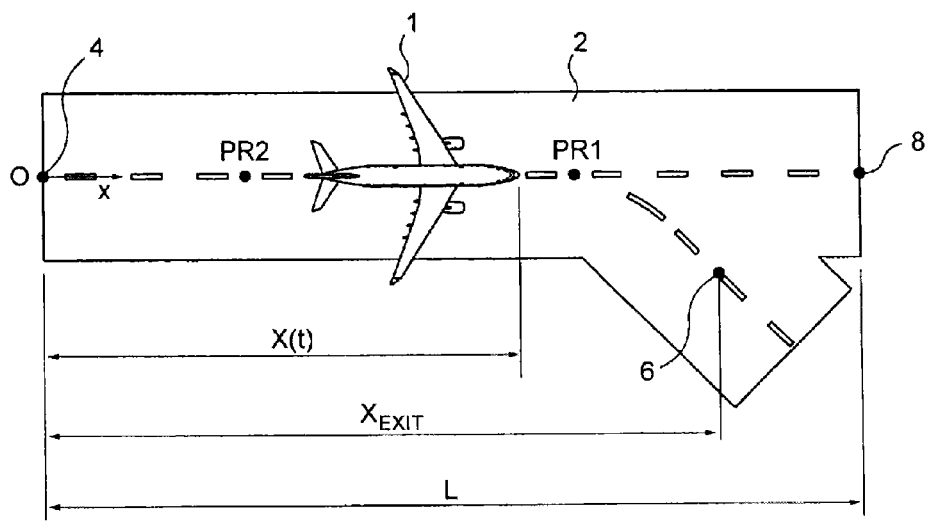

With reference to FIG. 1, the method that is the object of the invention makes it possible to have a vehicle 1, as it happens an airplane moving on a landing runway 2 with length L, from its departure point, which for airplane 1 corresponds to the point of touchdown of wheels 4, end up at a given point called "ending point," here the exit point of runway 6, at a speed determined beforehand.

The method advantageously provides a progressive and linear deceleration with an initial zero value up to a final value set if possible ("ramp-plateau" profile already referred to above).

Alternatively, this deceleration is degressive and linear, from an initial value, set if possible, to a very low final value ("plateau-ramp" profile).

The method also makes it possible to see to it that the deceleration is achieved in a context of safety, and this by easily integrating additional braking commands if a danger is detected, such as a recognized risk of overshooting a point beyond which the integrity of the vehicle is threatened.

In the case of airplane 1 of FIG. 1, this point may correspond to the runway end point 8 of runway 2.

In a preferred embodiment, a device 10 implementing the method in accordance with the invention is carried on board vehicle 1. Device 10 comprises means for interface 12 with an operator (for example with the aid of a screen, a keyboard, a touchscreen, . . . ), means for acquisition of current dynamic parameters 14, means for application of braking 16, and a computer 18.

Figure 2:
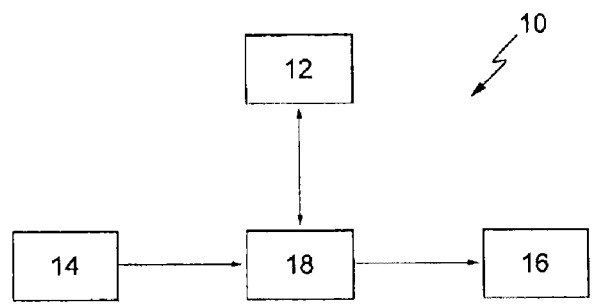
FIG. 2 is a block diagram illustrating the relationships between the various elements of a device implementing the method according to the invention.

The relationships among these various elements are illustrated on FIG. 2.

The means for interface 12 with the operator communicate in real time to computer 18 certain parameters that may be indicated by the operator, in particular the ending position or point marked $X_{EXIT}$ on FIG. 1, the speed of arrival at this ending point, the type of deceleration profile and the preselected deceleration value. These interface means also may comprise means for displaying at least some results obtained in the course of running the algorithm of FIG. 3.

The means for acquisition of current dynamic parameters 14 are able to measure directly via sensors or to estimate through other procedures the current speed and the current position V(t) of the vehicle marked X(t) on FIG. 1. These means communicate the values of these parameters to computer 18 in real time.

Figure 3:
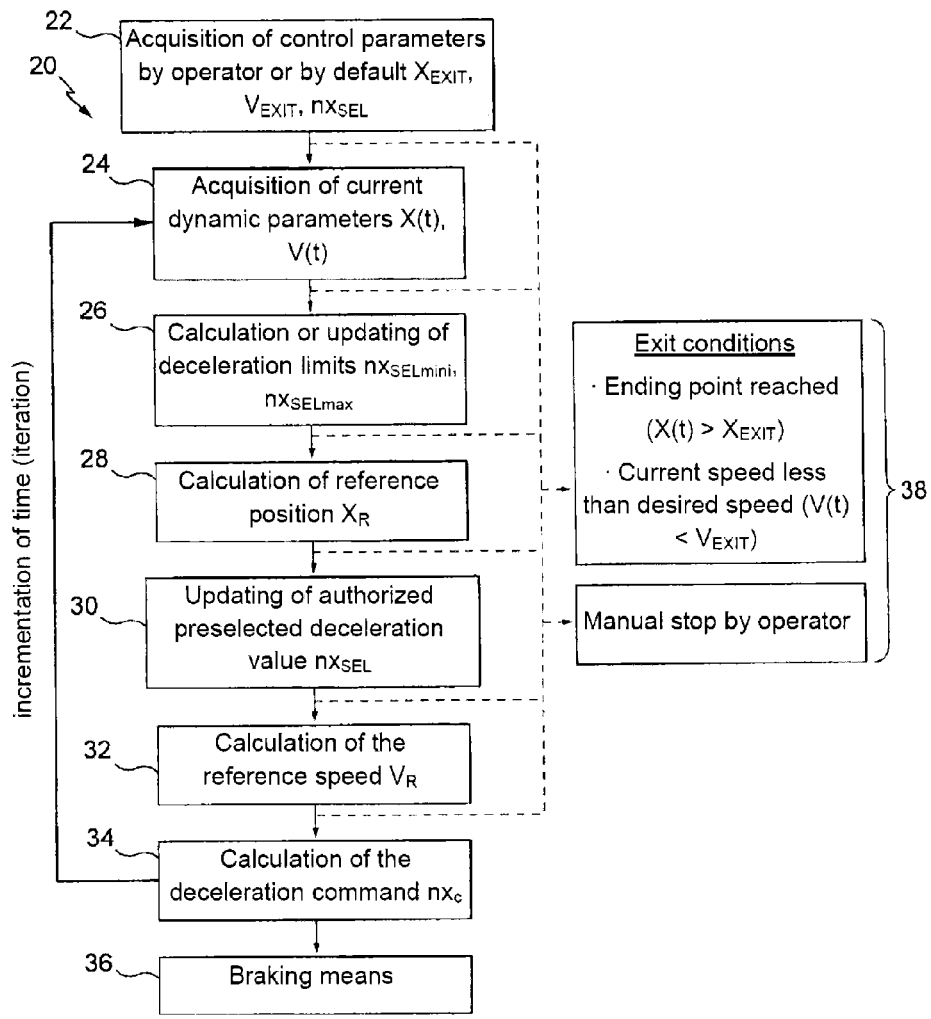
FIG. 3 is a flow chart representing the setup of the steps of the algorithm followed by the method according to the invention.

After obtaining the parameters indicated by interface means 12 and the current dynamic parameters provided by acquisition means 14, computer 18 runs algorithm 20 illustrated on FIG. 3 and described farther on.

At the conclusion of the algorithm, computer 18 communicates to braking application means 16 a calculated acceleration command, this in order to implement the braking adapted in this way.

Computer 18 also communicates to interface means or system 12 an estimate of the point and the speed for end of deceleration as will be seen farther on.

FIG. 3 illustrates in detail the steps of the method according to the invention (algorithm 20).

Initial step 22 is performed before touchdown of the wheels.

In the course of initial step 22, the computer acquires, by virtue of interface means 12, the parameters provided by the operator before the beginning of braking (parameters for control of deceleration).

In this regard, it will be noted that the interface means may comprise means for reception of such parameters, for example originating from outside the aircraft (ex: airport). Reception may be carried out, for example, via a radio or satellite communication means.

In the case of an airplane, the operator may be the crew or an operator outside the vehicle, for example an air-traffic controller.

In a preferred embodiment, these parameters comprise at least the ending position or point $X_{EXIT}$ and the preselected speed $V_{EXIT}$ at the end of braking (at position $V_{EXIT}$), as well as the selection of the type of braking profile from among at least two possibilities, namely ramp-plateau or plateau-ramp.

The operator also may choose to communicate or not to communicate the preselected deceleration value $nx_{SEL}$ to the device.

In the latter case, the algorithm calculates a value thereof by default, optimized from the other parameters.

Once initial step 22 is carried out, activation of the method according to the invention is performed either manually by the operator, or automatically by detection of touchdown of the wheels.

The step of acquisition of dynamic parameters 24 then is carried out. During the course of this step, algorithm 20 acquires, by virtue of means for acquisition of current dynamic parameters 14, the values of position X(t) and current speed V(t) of vehicle 1 at the instant considered.

Then in the course of step 26 of updating or of calculating the limit values for deceleration, the limits for minimum $nx_{SELmini}$ and maximum $nx_{SELmax}$ are obtained (for example from the values stored in memory). These limits are used in particular to adjust the preselected deceleration value.

In particular, the limit value for maximum deceleration is a priori different from the maximum value for deceleration $nx_{LVL}$ in the case of a ramp-plateau profile. These values may be equal under specific conditions set forth farther on.

In particular, these values may be calculated with the aid of the following formulas. For a ramp-plateau type profile, these formulas are:

$$nx_{SELmini} = \frac{V^2(t_1) - V^2(t_0)}{2 \cdot g \cdot (X(t_1) - X(t_0))} \text{ et}$$

$$nx_{SELmax} = \frac{2}{3g} \frac{(V(t_1) - V(t_0))(V(t_1) + 2 \cdot V(t_0))}{X(t_1) - X(t_0)}$$

and for a plateau-ramp type profile:

$$nx_{SELmax} = \frac{2}{3g} \frac{(V(t_1) - V(t_0))(2 \cdot V(t_1) + V(t_0))}{X(t_1) - X(t_0)}$$

where V is the current speed (V and V(t) are merged here, V implicitly depending on the instant considered), $t_0$ is the moment of activation of the device, $t_1$ the moment of end of deceleration, g the universal gravitation constant.

In the case of a "ramp-plateau" profile, if the preselected deceleration value has been indicated beforehand by the operator in the course of step 22, algorithm 20 ensures that it is within the calculated limits. Otherwise, this value is modified and set at the nearest authorized value.

If the preselected deceleration value $nx_{SEL}$ has not been indicated in the course of step 22, it optimally is set to the maximum deceleration limit value $nx_{SELmax}$.

In the case of a "plateau-ramp" profile, the deceleration value in the course of the plateau may be chosen in two ways: either set by the operator at a given value, and in this case it is necessary for him to indicate a condition according to which the beginning of the ramp occurs (for example from a certain speed or position of the vehicle), or calculated automatically.

In the course of the following step 28, a reference position $X_R$ is calculated in real time for example as a function of the current speed according to the following formula (where $nx_{SEL}$ is the preselected deceleration value).

$$X_R(V) = X(t_1) + \frac{2}{3} \frac{V(t_1) - V(t_0)}{g \cdot nx_{SEL}} \left[ \sqrt{\frac{V - V(t_0)}{V(t_1) - V(t_0)}} (V + 2 \cdot V(t_0)) - (V(t_1) + 2 \cdot V(t_0)) \right]$$

in the case of a ramp-plateau profile and according to the formula $$\begin{cases} X_R(V) = X(t_1) - \frac{(V(t_1) - V(t_0))^2}{g \cdot nx_{SEL}} \left[ \frac{(4 \cdot V(t_1) + 2 \cdot V(t_0))}{3 \cdot (V(t_1) - V(t_0))} - \frac{2 \cdot V(t_0)}{V(t_1) - V(t_0)} \beta - 2\beta^2 + \frac{2}{3}\beta^3 \right] \\ \beta = 1 - \sqrt{\frac{V - V(t_1)}{V(t_0) - V(t_1)}} \end{cases}$$

in the case of a plateau-ramp profile.

Advantageously, the value of the reference position of the vehicle in calculated in real time from the current speed of the vehicle and from the value of the maximum deceleration command authorized in the preceding step.

As long as the vehicle is situated in front of this reference position (marked PR1 on FIG. 1), the deceleration profile remains valid.

If the value of the current position of the airplane is greater than the value of the reference position (PR2 on FIG. 1), for example in the case where outside disturbances, (condition of the runway, of the tires of the vehicle . . . ) have contributed to braking more effectively than anticipated, that means that the contemplated profile no longer is appropriate, which activates the following step 30.

Step 30 is a step of updating the preselected maximum deceleration value $nx_{SEL}$. In the course of this step, the deviation between the current position of the vehicle and the reference position (alternatively between the current speed of the vehicle and the reference speed) is determined.

This step 30 takes place only when the deceleration profile no longer is valid.

In this way, if necessary, the preselected value of the deceleration is updated by reducing it proportionally to the deviation noted between the current position of vehicle 1 and the reference position.

Once the preselected deceleration value is updated, reference speed $V_R$ is calculated in the course of step 32. This speed is equal to that which vehicle 1 should have in order to arrive at the ending point at the preselected speed by following the preselected deceleration value.

It will be noted that when the deceleration profile is not modified, the algorithm provides for going directly from step 28 to step 32 without performing any update.

Advantageously, the value of the reference speed of vehicle 1 is calculated in real time from the current position of the vehicle and from the preselected deceleration value of the preceding step.

In this way, as set forth above, the values of the reference position of the vehicle, the reference speed of the vehicle and the maximum deceleration are updated interdependently.

The calculation of the braking command $nx_c$ is performed in the course of step 34 by applying the following formula $$nx_C(t) = nx(t_a) + (nx_{LVL} - nx(t_a))\left(1 - \sqrt{\frac{\Delta V(t)}{\Delta V(t_a)}}\right)$$

so as to achieve a braking corresponding to the selected profile, where $t_a$ is the switchover time of the deceleration profile, nx $(t_a)$ the current deceleration at the instant $t_a$ and where $nx_{LVL}$ is the deceleration for which the vehicle would reach the ending point at the preselected ending speed.

This calculation is based on the comparison between the current speed of vehicle 1 and the reference speed, that is to say that it takes into account the difference $\Delta V(t)$ between the reference speed $V_R$ and the current speed V. This difference is calculated according to the following formula (for an instant $t=t^*$):

$$\Delta V(t^*) = \Delta V(t_a) + g \cdot (nx_{LVL} - nx(t_a)) \cdot (t^* - t_a) + \frac{g^2(nx_{LVL} - nx(t_a))^2}{4 \cdot \Delta V(t_a)} (t^* - t_a)^2$$

This value $nx_c$ then is transmitted to braking application means 16 for implementation of the appropriate braking in step 36.

Once step 34 is carried out, the algorithm returns to step 24 in order to perform the calculation of the deceleration command at the following instant.

At any moment, computer 18 communicates to the means for interface with the operator 12 the parameters useful to the operator, chosen from among those calculated in the course of running the algorithm presented above.

Furthermore, it communicates an estimate of the point where the airplane will reach the preselected speed according to one of the two following cases:

If the current speed of the vehicle is less than the reference speed, this estimate is equal to the value of the ending position or point.

If the current speed of the vehicle exceeds the reference speed, this estimate is calculated according to the formula $$X_s(t) = X(t) + \frac{(V^2(t) - V_{exit}^2(t))}{2 \times 9.81 \times |n_x(t)|}$$

where $X_s(t)$ is the value of the estimate of the ending position or point, $X(t)$ is the current position of the vehicle, $V_{EXIT}(t)$ is the speed preselected by the operator (ending speed) and $n_x(t)$ is the current deceleration of the airplane, expressed in multiples of the universal gravitation constant g.

From the value of this estimate, a possible danger of overshooting the ending point, or a point beyond which the integrity of the vehicle is at stake, may be detected.

In this case, the type of deceleration profile may be changed automatically. For example, in the case where the profile selected beforehand is of "ramp-plateau" type, it may be changed into a profile of "plateau-ramp" type.

At any moment, algorithm 20 may be interrupted by the operator through interface means 12 by input of appropriate commands.

Alternatively, it may be interrupted when terminal conditions 38 are met. These terminal conditions include in particular the arrival of the vehicle at the ending point $X_{EXIT}$ or a current speed of the vehicle less than the predefined ending speed $V_{EXIT}$. When terminal conditions are met, the vehicle having reached its ending point and its desired speed, the commanded deceleration becomes zero and the vehicle, if it is an aircraft, must be taken over again by the pilot.

The invention claimed is:

1. A method for controlling deceleration of a vehicle on the ground, the method comprising:
    obtaining a plurality of control parameters, including a preselected deceleration value, a type of deceleration profile selected only from among a "ramp-plateau" deceleration profile and a "plateau-ramp" deceleration profile, an ending position of the vehicle, and a speed of the vehicle at the ending position;
    after said obtaining the plurality of control parameters, obtaining current dynamic parameters representative of a current position and a current speed of the vehicle;
    determining, from the obtained current dynamic parameters and from the obtained plurality of control parameters, a reference position and speed of the vehicle, the reference position being a theoretical position to be reached by the vehicle;
    determining, from the obtained current dynamic parameters and from the reference position and speed of the vehicle, a deceleration command to obtain a preselected ending position and speed of the vehicle; and
    outputting the deceleration command to perform controlled braking of the vehicle based on the deceleration command.

2. The method according to claim 1, wherein the method includes an iterative portion.

3. The method according to claim 2, wherein one of the reference position of the vehicle, the reference speed of the vehicle, and the preselected deceleration value is updated interdependently in the course of a same iteration of the iterative portion.

4. The method according to claim 1, wherein the value of the reference position of the vehicle is determined in real time from the current speed of the vehicle and from the preselected deceleration value obtained.

5. The method according to one of claims 1 to 4, wherein the value of the reference speed is determined in real time from the current position of the vehicle and from the preselected deceleration value.

6. The method according to claim 1, further comprising updating the preselected deceleration value in the course of a same iteration, said updating taking place between said determining the reference position and said determining the reference speed.

7. The method according to claim 6, wherein said updating the preselected deceleration value is performed based on one of a determination of a deviation between the current speed of the vehicle and the reference speed of the vehicle and a deviation between the current position of the vehicle and the reference position of the vehicle.

8. The method according to claim 1, further comprising at least one of:
    determining a deviation between the current speed of the vehicle and the reference speed of the vehicle; and
    determining a deviation between the current position of the vehicle and the reference position of the vehicle.

9. The method according to claim 1, wherein in the event of detection of an overshoot of the preselected ending position by the vehicle, the method further comprises changing the selected deceleration profile of the vehicle.

10. The method according to claim 9, wherein the deceleration command is determined without an estimate of a time from switchover between the ramp and fixed plateau of the selected type of deceleration profile.

11. The method according to claim 1, wherein said obtaining the plurality of control parameters includes obtaining a weight of the vehicle.

12. The method according to claim 1, wherein the vehicle is an aircraft, and wherein said obtaining current dynamic parameters occurs responsive to an indication of touchdown of one or more wheels of the aircraft.

13. The method according to claim 1, wherein data regarding the preselected ending position is received by the vehicle from a remote source via a wireless communication medium.

14. The method according to claim 1,
    wherein the preselected deceleration value corresponds to a value of deceleration of the plateau portion of the selected deceleration profile.

15. The method according to claim 1,
    wherein, when the plateau-ramp deceleration profile is selected as the type of deceleration profile, the reference position corresponds to a position in which the vehicle is anticipated to be situated moving at said current speed, according to the preselected deceleration value, and
    wherein, when the ramp-plateau deceleration profile is selected as the type of deceleration profile, the reference position corresponds to a position in which the vehicle is anticipated be situated moving at said current speed, according to a near-zero or zero deceleration value.

16. The method according to claim 1,
    wherein said obtaining the current dynamic parameter representative of the current speed of the vehicle is obtained using one or more vehicle sensors, and
    wherein the deceleration command is output to vehicle braking circuitry to perform the controlled braking of the vehicle based on the output deceleration command.

17. A system for controlling deceleration of a vehicle on the ground, the device comprising:
    means for obtaining a plurality of control parameters, including a preselected deceleration value, a type of deceleration profile selected only from among a "ramp-plateau" deceleration profile and a "plateau-ramp" deceleration profile, an ending position of the vehicle, and a speed of the vehicle at the ending position;
    means for obtaining current dynamic parameters representative of a current position of the vehicle and a current speed of the vehicle, the current dynamic parameters being obtained after said means for obtaining obtains the plurality of control parameters;
    means for determining, from the obtained current dynamic parameters and from the obtained plurality of control parameters, a reference position and speed of the vehicle, the reference position being a theoretical position to be reached by the vehicle;
    means for determining from the obtained current dynamic parameters and from the reference position and speed, a deceleration command to obtain a preselected ending position and speed of the vehicle; and
    braking application means for receiving the deceleration command and applying a braking force to the vehicle based on the deceleration command.

18. The system according to claim 17, further comprising means for obtaining an estimate of a position where the vehicle will reach the preselected ending speed.

19. An aircraft comprising at least one system according to one of claims 17 to 18.

* * * * *